UNITED STATES PATENT OFFICE.

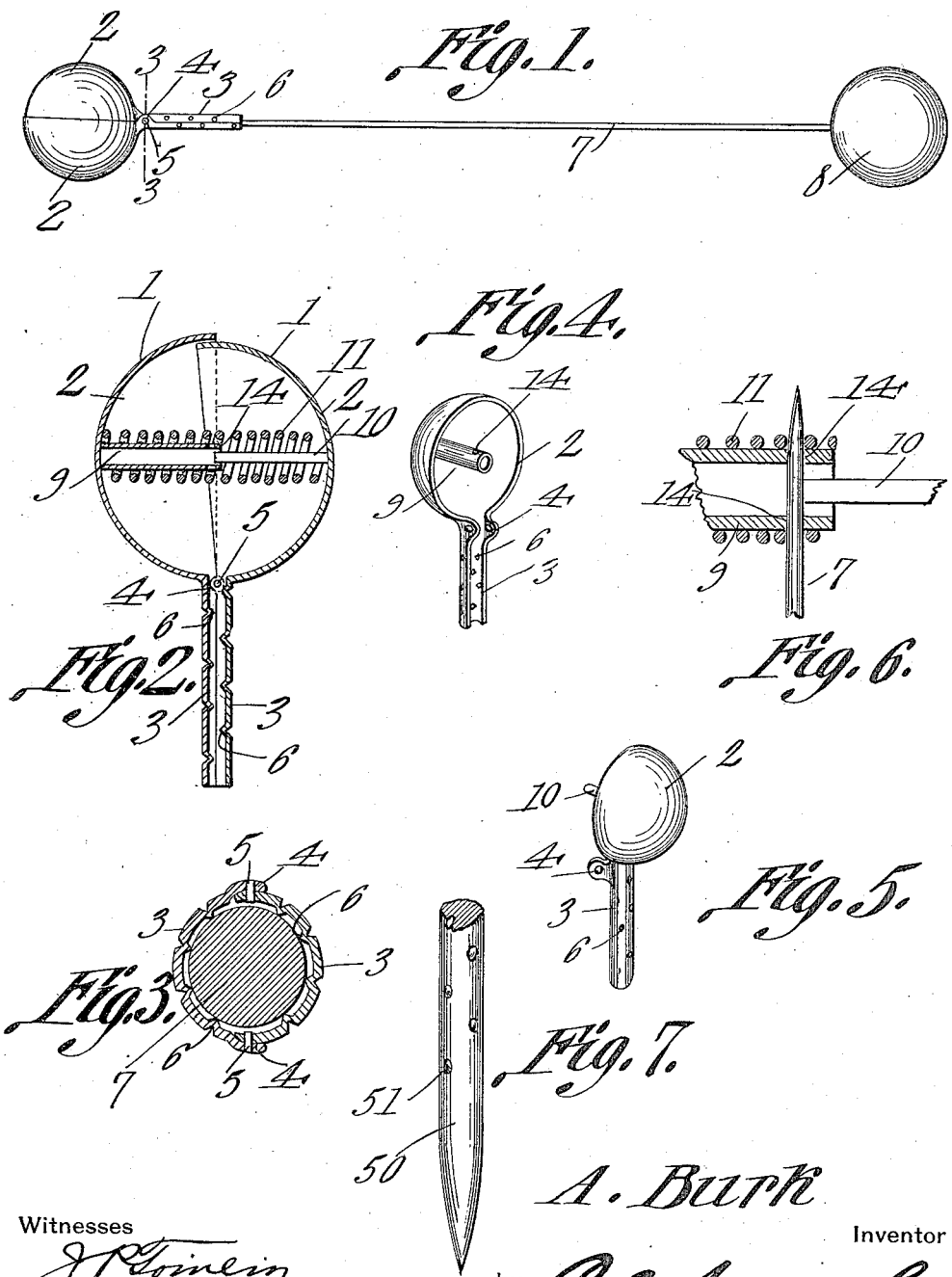

ANTHONEY BURK, OF GRINDSTONE, PENNSYLVANIA.

PIN-PROTECTOR.

1,045,369.  Specification of Letters Patent.  Patented Nov. 26, 1912.

Application filed March 18, 1912. Serial No. 684,597.

*To all whom it may concern:*

Be it known that I, ANTHONEY BURK, a citizen of the United States, residing at Grindstone, in the county of Fayette and State of Pennsylvania, have invented a new and useful Pin-Protector, of which the following is a specification.

The objects of the present invention are to provide a shield for the point of a hat pin, a tie pin or the like, the shield being so constructed that it will automatically grip the pin and house the point thereof, novel means being provided for preventing a displacement of the shield from the pin.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in side elevation, applied to a pin; Fig. 2 shows the invention in longitudinal section; Fig. 3 is a transverse section on the line 3—3 of Fig. 1; Fig. 4 is a perspective of one of the constituent members of the device; Fig. 5 is a perspective of the other of the constituent members of the device; and Fig. 6 is a sectional detail enlarged from Fig. 2, showing the pin in place. Fig. 7 is a fragmental side elevation showing a slight modification in the pin.

In carrying out the invention there are provided a pair of members denoted generally by the numeral 1, each member 1 consisting of a hemispherical point-shielding part 2 and a trough-shaped pin-gripping part 3. The members 1 are provided intermediate their ends with overlapped ears 4, through which are passed pivot elements 5. One of the point-shielding parts 2 is of larger diameter than the other, so that the parts may interfit, when the members 1 are swung upon their pivotal connections 5. As shown to best advantage in Fig. 3, the pin-gripping parts 3 may be provided with teeth 6, adapted to engage the pin 7, the head of the pin being denoted by the numeral 8.

Projecting inwardly from one of the point-shielding parts 2 is a tube 9. A flexible spindle 10 projects from the other point-shielding part 2 and enters the tube 9, the members 9 and 10 constituting overlapped elements located within the point-shielding parts 2. Surrounding the tube 9 and the spindle 10 is a helical compression spring 11, bearing at its ends against the point-shielding parts. The tube 9 and the spindle 10 obviously serve to retain the spring 11 in place.

The point of the pin 7 is thrust between the pin-gripping parts 3, the teeth 6 engaging the pin. The spring 11 serves to thrust the point-shielding parts 2 apart, and to thrust the pin-gripping parts 3 together, to hold the device upon the pin. In the tube 9 there are openings 14, alined with the pin-gripping parts 3. Through the openings 14 the point of the pin 7 may be thrust, and when the point of the pin is engaged in the openings 14, the pin will form an abutment for the spindle 10, as shown in Fig. 6 and it will be impossible to force the point-shielding parts 2 together, and release the pin-gripping parts 3 from the pin 7, until the point of the pin is withdrawn from the openings 14. Moreover, the convolutions of the spring 11 are so positioned, as clearly shown in Fig. 6, that they will engage the pin, and prevent an accidental withdrawal of the pin from the openings 14.

If desired, the pin 50 may be roughened in any desired manner as indicated at 51, to interengage the teeth 6 of the gripping parts 3.

Having thus described the invention, what is claimed is:—

1. A device of the class described comprising a pair of members pivotally connected intermediate their ends, the members terminating at one end in coöperating pin-gripping parts and at the other end terminating in coöperating point-shielding parts; a tube projecting from one of the point-shielding parts; a spindle projecting from the other of the point-shielding parts and adapted to register within the tube; and a spring surrounding the spindle and the tube and abutting terminally against the point-shielding parts; there being an opening through the tube, alined with the pin-gripping parts, and adapted to receive a pin, whereby the pin will serve as an abutment for the spindle and prevent a separation of the pin-gripping parts, the spindle terminating adjacent the opening.

2. A device of the class described comprising a pair of members pivotally connected intermediate their ends, the members terminating at one end in coöperating pin-gripping parts and at the other end terminating in coöperating point-shielding parts; a tube projecting from one of the point-shielding parts; a spindle projecting from the other of the point-shielding parts and adapted to register within the tube, the tube being provided with an opening, alined with the pin-gripping parts, and adapted to receive the pin, whereby the pin will constitute an abutment for the spindle and prevent a separation of the pin-gripping parts, the spindle terminating adjacent the opening; and a helical spring surrounding the spindle and the tube and abutting against the point-shielding parts, the convolutions of the spring being arranged to engage the pin, to hold the pin in the opening.

3. A device of the class described comprising pivotally connected point-shielding parts provided with coöperating pin-gripping members and having elements in their interiors which project toward each other, said elements having faces adapted to abut against opposite sides of a pin whereby the pin will prevent a separation of the pin-gripping members; the pin-gripping members constituting means for guiding the pin between said faces.

4. A device of the class described comprising a pair of members pivotally connected intermediate their ends, the members terminating at one end in coöperating pin-gripping parts and at the other end terminating in coöperating point-shielding parts; overlapped elements projecting from the interiors of the point-shielding parts, one of said elements being provided with an opening alined with the pin-gripping parts, and adapted to receive a pin, whereby the pin will constitute an abutment for the other element, and prevent a separation of the pin-gripping parts, the other of said elements terminating adjacent the opening; and a spring surrounding said elements and abutting against the point-shielding parts, to maintain the pin-gripping parts in coöperation, certain of the convolutions of the spring being located upon opposite sides of the opening thereby to engage the pin, when the pin is in the opening, and to hold the pin against withdrawal from the opening.

In testimony that I claim the foregoing as my own, I have hereto affixed my signature in the presence of two witnesses.

ANTHONEY his × mark BURK.

Witnesses:
MIKE GERDICH,
JOHN SILK.

Copies of this patent may be obtained for five cents each, by addressing the "Commissioner of Patents, Washington, D. C."